United States Patent Office 3,425,237
Patented Feb. 4, 1969

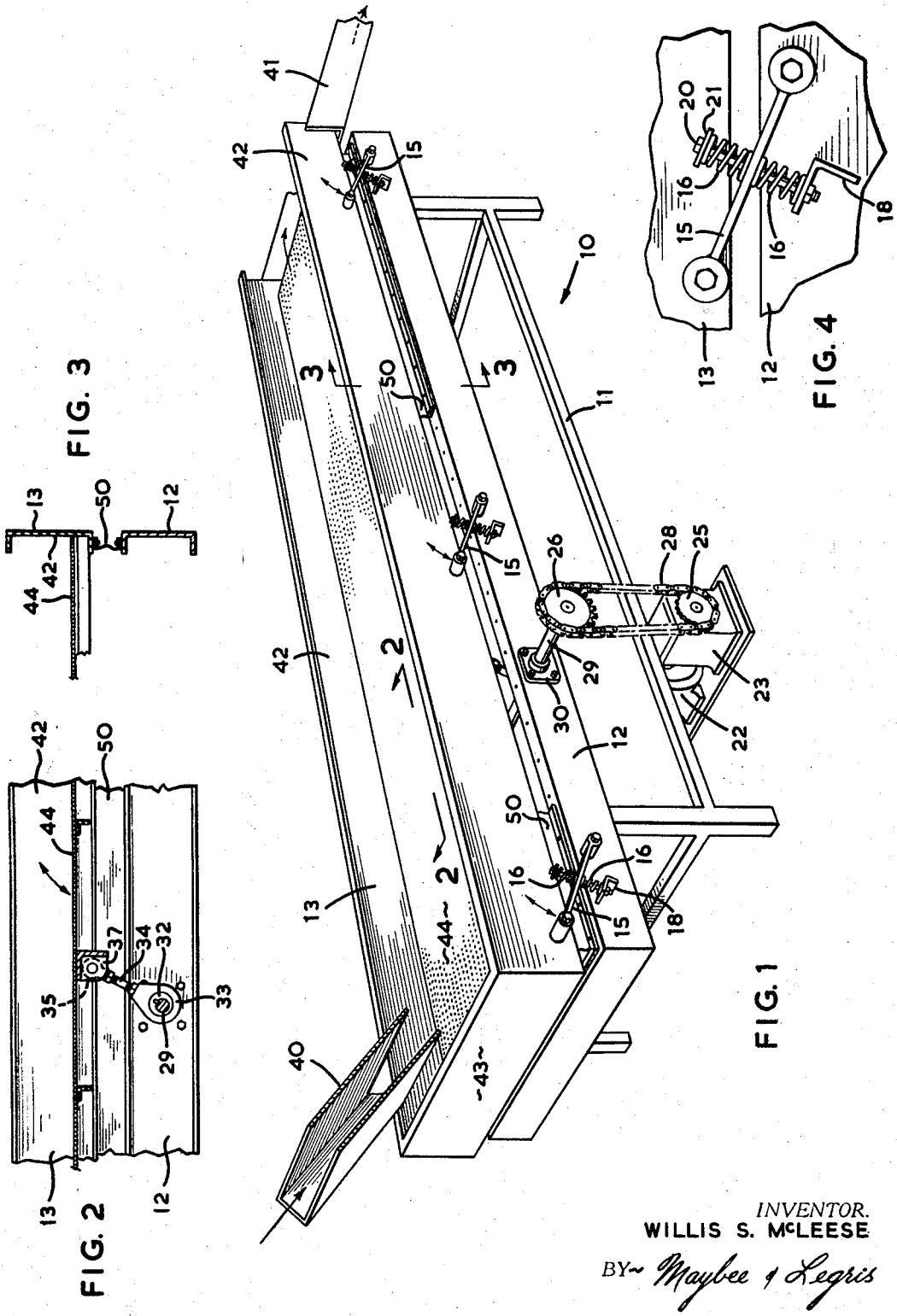

3,425,237
VIBRATING FOOD FREEZER
Willis S. McLeese, 88 Dunvegan Road, Toronto, Ontario, Canada
Filed Aug. 22, 1966, Ser. No. 573,905
Claims priority, application Canada, Sept. 2, 1965, 939,711
U.S. Cl. 62—380         3 Claims
Int. Cl. F25d *25/04, 13/00;* B65g *27/10*

ABSTRACT OF THE DISCLOSURE

In an apparatus for continuously freezing food items by passing refrigerated air upwardly through the food items, the food items are conveyed through a refrigerating zone by means of a vibratory conveyor having a foraminous surface, the conveyor agitating or fluidizing the items. The apparatus provides a closed air-circulating path whereby the refrigerated air is continuously circulated through the foraminous tray and past the food items and over refrigeration coils.

---

This invention relates to apparatus for continuously cooling or freezing food items, and has to do particularly with apparatus which utilizes refrigerated air as the cooling medium, the latter passing through the moving food items generally upwardly and perpendicularly to their direction of travel.

Of the prior art devices presently in use, two have particular disadvantages which the present invention is designed to overcome.

The first is shown on pages 30 and 31 of the October 1962 edition of Food in Canada, and consists essentially of a wire-mesh belt which moves horizontally beneath a shaker spreader device which evenly distributes food items such as corn or peas over the surface of the moving belt. As the belt moves horizontally, refrigerated air is forced up through the openings in the wire-mesh to cool and freeze the food items. In this prior art device, it is necessary to employ an air pressure differential of about 5 inches of water in order to keep the food particles sufficiently agitated to prevent clustering. As well, the problem of maintaining sufficient agitation becomes more and more acute as the particles increase in size, requiring more and more fan horsepower to maintain the high pressure differential.

The second prior art device is shown on page 32 of the same issue of Food in Canada. A stationary, perforated tray or trough is positioned so as to be slightly inclined to the horizontal, and refrigerated air is blown upwardly through the perforations in the tray. The food items such as peas are poured onto the "upper" end of the tray, and thus "migrate" along the slightly tilted tray because the upward blast of air keeps the cool items in constant agitation and, in effect, "fluidizes" them. The cooled items reach the "lower" end of the tray in a frozen condition and are removed therefrom for packaging. For this device as well, a pressure differential of approximately 5 inches is required to "fluidize" the particles sufficiently to permit migration from the upper to the lower end of the tray. However, as the food particles increase in size it becomes more and more difficult to maintain sufficient agitation for proper migration. For example, a very large item such as a poultry item would not likely be moved at all, but would merely block certain of the perforations, causing the refrigerated air to flow at an increased rate out of those perforations not closed.

A further disadvantage of the latter prior art device relates to the heat transfer coils used to cool the refrigerating air. The prior art device requires that an antifreeze solution be dripped continuously over the air-cooling heat transfer coils to prevent any build-up of condensed moisture or frost on the coil surfaces. If this occurred, it would have the effect of reducing the quantity and pressure of the refrigerating air available at the tray, due to the partial blockage of the air passages through the coils, and this reduction would affect migration of the product from the feed to the harvest end of the tray.

The use of an antifreeze solution dripping constantly over the air-cooling heat transfer coils, absorbing water from both the products and the air, also requires costly regenerative apparatus to remove the water from the likewise costly antifreeze solution so that the latter may be reused.

It is an object of this invention to eliminate the need for the antifreeze solution, the piping, the pump and distribution arrangement, the regenerative device and the energy required to operate it. This object is achieved by virtue of the fact that in this invention the migration of food items depends only partly upon air quantity and pressure, these latter being permitted to fluctuate through quite wide limits without seriously reducing either the freezing output or the migration of food items.

It is also, therefore, an object of this invention to provide a device of the above type wherein the pressure differential of the refrigerating air is not critical, and in which migration of the food items from the feed to the harvest end is only partially dependent upon the available pressure differential of the refrigerated air.

Another object of this invention is to provide a device for continuously cooling or freezing food items, in which the pressure differential of the refrigerated air can be reduced to the neighbourhood of 1 inch, without impairing migration.

Another object of this invention is to provide a device of the above type capable of continuously freezing food particles of any reasonable size without clustering.

A further object of the invention is to provide a device of the above type wherein migration of the items from the delivery end to the removal end is assured, regardless of the size of the food items.

A still further object of this invention is to provide a highly efficient device which distributes its own products evenly over its own freezing tray, thereby eliminating the extra shaker spreader required with the first prior art device referred to above.

Yet another object of this invention is to provide a highly efficient device requiring a minimum of insulated space to house and to feed it.

Yet another object of the present invention is to provide a device of the above type wherein the angle of the tray to the horizontal is not a critical factor in maintaining migration, provided the departure from the horizontal is not too great.

Still another object of this invention is to provide a simple means for adjusting the time of exposure to refrigerating air in relationship to the size and type of food items of particles being processed.

Essentially, the present invention involves providing a substantially horizontal foraminous tray, means for vibrating the tray so that its vibration has both a vertical and a horizontal component such that food items on the tray can migrate along the tray during vibration, and means for passing refrigerated air through the foraminous tray and thus past the food items on the tray, thereby cooling or freezing the items. Both the upward moving refrigerated air and the vibration contribute to the migration of the food items. The invention contemplates adjusting the vibration such that the vertical component is large by comparison with the horizontal component, so as to prolong the length of time that a given food item is on the tray so that complete freezing can be effected. This vibration also permits the product bed to be broken up to permit low pressure refrigerating air to pass through and around each product particle, preventing the individual particles from surface freezing to each other. Thus, the desirable result known in the trade as "individually quick freezing" or "free pouring" can be attained without the necessity of any mechanism to break up clusters which might otherwise form.

Speeds as low as one foot per minute are desirable for proper freezing, and achieving speeds of this order is a matter of regulating with respect to one another the following parameters: frequency and amplitude of vibration; horizontal and vertical components of vibration; air pressure differential available at the perforations in the tray; quantity of air passing through the tray; distribution of air throughout the entire area of the tray; refrigerating effect of the air. Adjustment of vibration frequency is a simple way of regulating the speed of migration, and thus the duration of exposure of any given food item to refrigerating air.

One embodiment of this invention is shown on the accompanying drawings, wherein like numbers refer to like parts throughout the several views, and in which:

FIG. 1 is a perspective view of an apparatus for continuously cooling food items;

FIG. 2 is a vertical sectional view taken at 2—2 in FIG. 1;

FIG. 3 is a transverse vertical sectional view taken at 3—3 in FIG. 1;

FIG. 4 is an elevation view, to a larger scale, of one of the elements shown in FIG. 1.

Figure 5:
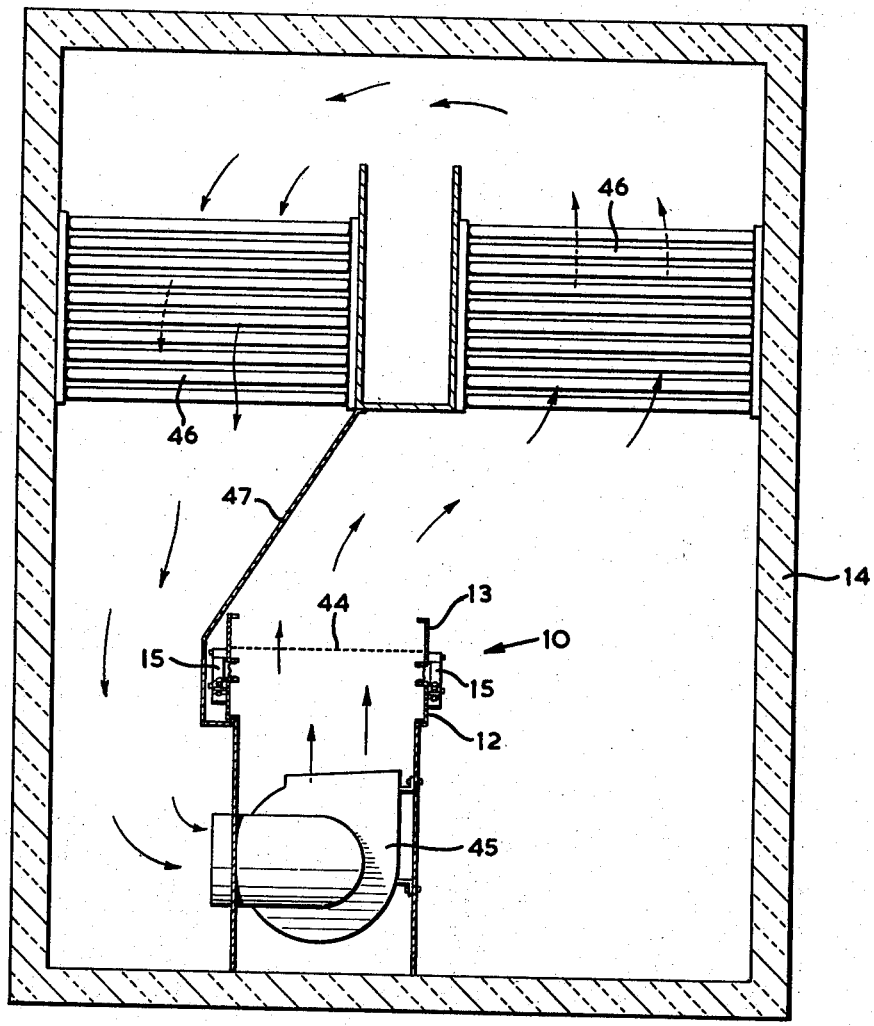
FIG. 5 is a vertical sectional view of a freezing room in which the device of FIG. 1 is situated.

In FIG. 1, the device generally shown at 10 includes a base 11 supporting the stationary frame 12, from which is oscillatingly supported a tray 13. Completely surrounding the frame 12 and the tray 13 is an enclosure or room 14 as shown in FIG. 5, which serves to contain and to recirculate the refrigerated air employed in freezing food items on the tray 13.

The tray 13 is suspended above the frame 12 by means of a plurality of connecting rods 15 on either side of the elongated tray 13. Only the connecting rods on the near side are visible in FIG. 1.

The connecting rods 15 are adapted to be positioned at an angle of approximately 25° to the horizontal, and are retained at this angle by means of coil springs 16.

As shown more clearly in FIG. 4, a bracket 18 is welded or otherwise firmly secured to the bed 12. The bracket 18 has an aperture (not shown) which is approximately aligned with another aperture (not shown) through the connecting rod 15. A bolt 20 is passed through the two apertures, and is arranged with a washer 21 in such a way that the two springs 16 are compressed, one on either side of the connecting rod 15.

The means for giving positive vibration to the tray includes an electric motor 22, which operates through a reduction gear box 23 to rotate a first sprocket 25 which turns a second sprocket 26 by way of a chain drive 28.

The sprocket 26 is secured to and turns a shaft 29, which rotates within bearings 30 (only one shown) which are secured to the bed 12.

FIGURE 2 shows the way in which the tray 13 is made to rock or vibrate positively about the connecting rods 15. Keyed to the shaft 29 is an eccentric wheel 32 which rotates within a yoke 33. A rod 34 extends from the yoke 33 to a head 35, the latter being pivotally secured to an angle bracket 37 fixed to the tray 13.

The rod 34 is oppositely threaded at either end such that, by rotating it, the distance between the yoke 33 and the head 35 can be shortened or lengthened. As will be clear, rotation of the shaft 32 will cause a positive oscillatory motion to be transmitted to the head 37, which in turn transmits the same to the tray 13, causing the latter to oscillate or rock about the connecting rods 15. The amplitude of the vibration depends upon the eccentricity of the eccentric wheel 32.

It will be realized that if the amplitude of the vibration is kept small the tray 13 will move substantially rectilinearly along a line inclined approximately 25° to the vertical.

With such vibration, food items such as peas, corn, carrots, french fried potatoes, fish fillets, etc., will be caused to migrate along the tray 13. In this case, the migration will take place from the left-hand end to the right-hand end as depicted in FIG. 1.

It is equally clear that the vibration must consist of a vertical and a horizontal component, since, in the absence of either of these components, no migration can occur. A first chute 40 is adapted to continuously deliver food items which are to be cooled or frozen to the tray 13, while a second chute 41 permits the cooled or frozen food items to be continuously removed from the tray 13.

The tray 13 itself comprises two side walls 42, an end wall 43, and a foraminous or perforated bottom 44. Preferably the foraminous bottom 44 is made of flat, perforated metal.

Refrigerated air is made to pass upwardly through the foraminous tray, and thus past the food items on the tray, thereby cooling the items. Referring to FIG. 5, the enclosure 14 contains a vibrating freezer 10, one or more centrifugal fans 45, refrigeration coils 46 and baffles 47. As can be seen, the baffles 47 are arranged so as to cause the refrigerating air to pass from the fan 45 up through the vibrating tray 13, thence through the coils 46 and back down to the intake of the fan 45.

As shown in FIG. 3, a flexible seal 50, preferably made of canvas or other rugged material, is arranged between the bed 12 and the tray 13 so that, regardless of relative movement between the two, refrigerated air passing upwardly through the bed 12 must continue through the perforated metal bottom 44 of the tray 13. The flexible seal 50 is arranged with enough slack to accommodate the maximum vibrational amplitude that the tray 13 can be given.

It is to be understood that while 25° to the horizontal has been found to be a satisfactory mean angle for the connecting rods 15, departure within limits from this mean angle will not destroy the function of the continuous freezer. For example, decreasing the angle of the connecting rod will enlarge the vertical component of the vibration and diminish the horizontal component, thus tending to decrease the rate of migration of food items from one end of the tray 13 to the other. This arrangement might be particularly suitable for food items which require longer time on the tray 13 for complete freezing.

On the other hand, an increase in the mean angle of the connecting rod 15 would have the opposite affect, and might be preferable where it is desired to shorten the time during which food items are on the tray 13.

As pointed out above, it is also possible to regulate the speed of migration by adjusting the vibration frequency of the tray.

While it is generally desirable to situate the tray 13 as nearly horizontally as possible, a small departure from the horizontal would not seriously affect the functioning of the device.

Because in the present invention the refrigerated air is not the sole factor promoting migration and maintaining fluidity in the food particles, lower air pressure differentials are permissible. It has been found that a pressure differential of the order of 1 inch of water is sufficient.

What I claim as my invention is:

1. A continuous freezer for freezing food items comprising a stationary frame, a substantially horizontal, elongated formaminous tray located above said frame, means for vibrating the tray so that its vibration has a vertical component and a horizontal component such that food items on the tray tend to migrate along the tray during vibration, and means for passing refrigerated air through the foraminous tray and thus past the food items on the tray, thereby cooling the items, said means for vibrating the tray comprising a plurality of link members of equal length, each pivotally secured at its upper end of the tray and at its lower end to the stationary frame, each of the link members being resiliently retained at an angle of approximately 25° to the horizontal tray, the tray being thus capable of vibration in an arcuate path, and reciprocating means for giving the tray a vibration of small amplitude in said arcuate path, which vibration is substantially linear due to the small amplitude, said reciprocating means comprising a motor, a shaft mounted in said frame and rotated by said motor, at least one connecting rod extending upwardly from said shaft to the tray at substantially right angles to the link members, the connecting rod being pivotally secured at its upper end to the tray and being mounted at its lower end about an eccentric fixed to rotate with said shaft, thereby to give positive vibratory movement to the tray while the shaft is being rotated by the motor.

2. Apparatus for continuously freezing food items comprising
(a) a substantially horizontal elongated foraminous tray;
(b) an enclosure surrounding the tray;
(c) means for vibrating the tray so that its vibration has a vertical component and a horizontal component which is directed longitudinally of the tray such that food items on the tray tend to migrate longitudinally of the tray during vibration;
(d) means for continuously delivering food items to the tray;
(e) means for continuously removing food items from the tray;
(f) fan means disposed for blowing air upwardly through the tray and thus past the food items on the tray;
(g) refrigerating means having refrigeration coils; and
(h) means defining a closed air-circulating path whereby air from the fan means is circulated upwardly through the foraminous tray and past the food items on the tray, over the refrigeration coils and back to the fan means, in which the tray is located above a stationary frame, and in which the means for vibrating the tray comprises a plurality of link members, each pivotally secured at its upper end to the tray and at its lower end to the stationary frame, each of the link members being resiliently retained at an angle of approximately 25° to the horizontal tray, the tray being thus capable of vibration in an arcuate path, a motor, a shaft mounted in the frame and rotated by the motor, at least one connecting rod extending upwardly from the shaft to the tray at substantially right angles to the link members, the connecting rod being pivotally secured at its upper end to the tray and being mounted at its lower end about an eccentric fixed to rotate with said shaft, thereby to give positive vibratory movement to the tray as the shaft is being rotated by the motor.

3. Apparatus according to claim 2, in which the refrigeration coils are disposed within the enclosure, and in which the means defining a closed air-circulation path comprise a baffle means extending upwardly from one side of the tray whereby refrigerated air passing upwardly through the tray and past the food items is directed along a path on one side of the baffle means, through the refrigeration coils, and along a path on the other side of said baffle means.

References Cited
UNITED STATES PATENTS

| | | | |
|---|---|---|---|
| 2,300,229 | 10/1942 | Knowles | 34—164 X |
| 2,633,171 | 3/1953 | Daman | 34—164 X |
| 2,795,318 | 6/1957 | Morris | 198—220 |
| 2,900,179 | 8/1959 | Kaufmann | 34—164 X |

ROBERT A. O'LEARY, *Primary Examiner.*

WILLIAM E. WAYNER, *Assistant Examiner.*

U.S. Cl. X.R.

62—63; 165—120; 198—220; 34—164